US008623162B2

(12) United States Patent
Seo et al.

(10) Patent No.: US 8,623,162 B2
(45) Date of Patent: Jan. 7, 2014

(54) FABRICATING METHOD OF FLEXIBLE DISPLAY

(75) Inventors: Hyun Sik Seo, Gyeonggi-do (KR); Seung Han Paek, Incheon (KR); Nack Bong Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 37 days.

(21) Appl. No.: 13/363,272

(22) Filed: Jan. 31, 2012

(65) Prior Publication Data

US 2012/0125529 A1 May 24, 2012

Related U.S. Application Data

(62) Division of application No. 11/311,377, filed on Dec. 20, 2005, now Pat. No. 8,147,640.

(30) Foreign Application Priority Data

May 13, 2005  (KR) .............. 10-2005-40240
Jul. 14, 2005  (KR) .............. 10-2005-63930

(51) Int. Cl.
*B29C 65/52* (2006.01)

(52) U.S. Cl.
USPC ......... 156/249; 156/275.7; 156/291; 156/711

(58) Field of Classification Search
USPC ........... 156/245, 247, 249, 272.8, 275.7, 291, 156/711
See application file for complete search history.

(56) References Cited

U.S. PATENT DOCUMENTS

| 2,294,347 | A | 8/1942 | Bauer et al. |
| 5,476,566 | A | 12/1995 | Cavasin |
| 5,591,290 | A | 1/1997 | Walter et al. |
| 5,592,288 | A * | 1/1997 | Sampica et al. ............ 356/62 |
| 6,432,497 | B2 | 8/2002 | Bunyan |
| 6,458,234 | B1 | 10/2002 | Lake et al. |
| 6,866,928 | B2 | 3/2005 | Narum et al. |
| 7,404,751 | B2 * | 7/2008 | Handa et al. ............ 445/24 |
| 2004/0239586 | A1 | 12/2004 | Cok |

FOREIGN PATENT DOCUMENTS

JP          2000241822 A      9/2000

* cited by examiner

*Primary Examiner* — Michael Tolin
(74) *Attorney, Agent, or Firm* — Morgan, Lewis & Bockius LLP

(57) ABSTRACT

A fabricating method of a flexible display device includes forming first and second jig substrates that have a first groove and a second groove formed in a lower part of an edge of the first groove; spreading an adhesive over the second groove; fixing first and second flexible substrates to the first groove and the adhesive; fabricating an upper array substrate on the first flexible substrate and a lower array substrate on the second flexible substrate; bonding the upper array substrate to the lower array substrate and injecting a liquid crystal; and peeling the first and second flexible substrates from the first and second jig substrates.

6 Claims, 27 Drawing Sheets

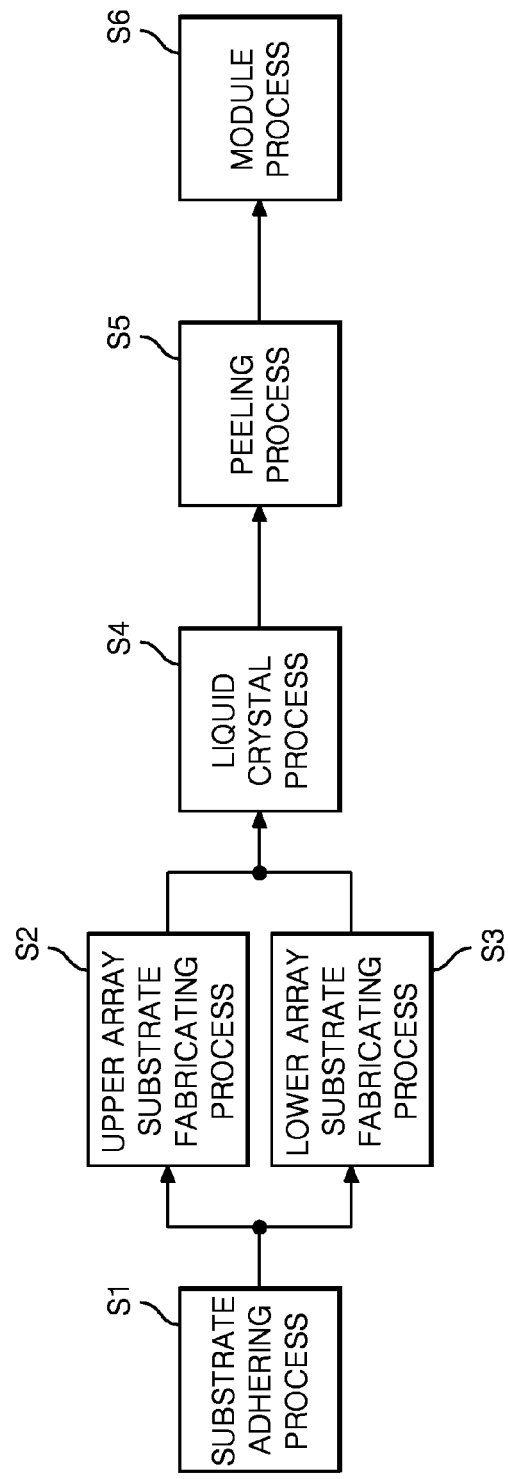

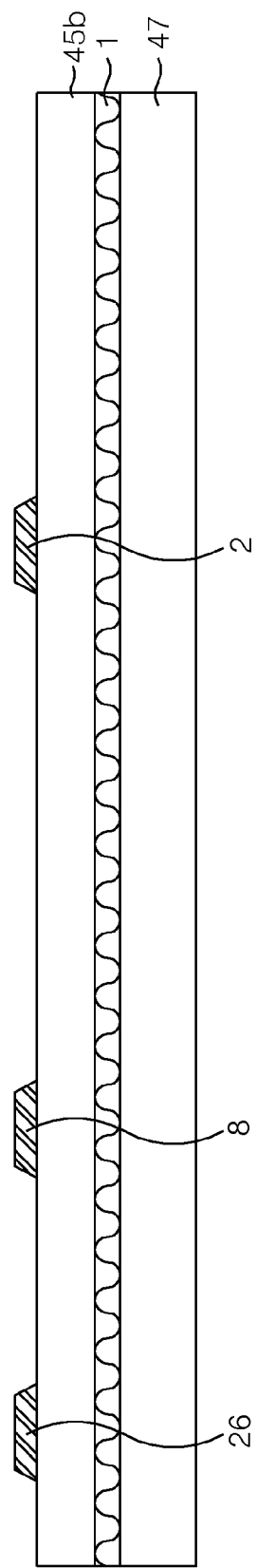

FABRICATING METHOD OF FLEXIBLE DISPLAY

This is a divisional of U.S. application Ser. No. 11/311,377, filed Dec. 20, 2005, now U.S. Pat. No. 8,147,640, which also claims the benefit of the Korean Patent Application No. P2005-40240 filed May 13, 2005 and Korean Patent Application No. P2005-63930 filed Jul. 14, 2005, all of which are hereby incorporated by reference.

BACKGROUND OF THE INVENTION

1. Field of the Invention

The present invention relates to a flexible display device, and more particularly, to a fabricating method of a flexible display device to prevent a substrate from being peeled apart during a fabricating process of the flexible display device.

2. Description of the Related Art

The display device market rapidly changed recently, and now a central place in the market has been taken by flat panel display (FPD) devices. The FPD devices are easily made large-sized, thin, and light. The FPD devices include liquid crystal displays (LCDs), plasma display panels (PDPs), organic electro luminescence displays (OLEDs), etc. However, the existing liquid crystal displays, plasma display panels, organic electro luminescence displays, etc. are made of a glass substrate, thereby limiting application and usage because there is no flexibility.

Accordingly, a flexible display device capable of bending has been fabricated using a substrate of a material having flexibility, such as plastic or foil, has been rapidly rising as a next generation display device in place of the existing glass substrate with no flexibility. The flexible display device is often called a "bendable display" or "rollable display." A method of realizing the flexible display device can be classified into two methods: using the existing display device and using an e-paper.

The method of using the existing display device is a method of making the material of a thin film transistor liquid crystal display device, an organic electro luminescence display device, etc. flexible. In contrast, with the method of using the e-paper, a display device has been developed using a cholesterol liquid crystal, and an electrophoresis display device using a micro capsule, an electrophoresis and a half globular twist ball charged with static charge. There is a disadvantage with the e-paper in that full color realization is difficult and there is a limit in realizing motion picture due to a slow operating speed.

Accordingly, a study for realizing a flexible display device using the existing display device has been the recent focus of much research. To this end, a subject of study is that a display part and a switching part in core parts of the existing display device—including the display part, a driving part and the switching part—are made with flexibility.

Specially, to give flexibility to the display part of the flexible display device, a flexible substrate should be used. However, an electrode formation should be precisely performed in the fabricating process of the display device, thus a substrate should act to support sufficiently. To this end, a rigid substrate should be adhered thereto. When adhering the rigid substrate, an adhesive is used with which adhesion and detachment are possible. There is a problem when the rigid substrate and the flexible substrate are adhered to each other because the adhesive can come apart during the fabricating process of the flexible display device.

SUMMARY OF THE INVENTION

Accordingly, the present invention is directed to a fabricating method of a flexible display that substantially obviates one or more of the problems due to limitations and disadvantages of the related art.

Accordingly, it is an object of the present invention to provide a fabricating method of a flexible display device that prevents a substrate from being peeled apart during a fabricating process of the flexible display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fabricating method of a flexible display device comprises the steps of providing an adhesive layer including a first adhesive material on a first surface of a support film, a second adhesive material on a second surface of the support film such that an adhesive strength (or a viscosity) of the second adhesive material is lower than an adhesive strength of the first adhesive material, and a third adhesive material encompassing an edge of the second adhesive material such that an adhesive strength of the third adhesive material is higher than the adhesive strength of the second adhesive material; a first passivation film adhered to the first surface of the support film with the first adhesive material therebetween; and a second passivation film adhered to the second surface of the support film with the second adhesive material and the third adhesive material therebetween; peeling the first passivation film from the adhesive layer; adhering a rigid substrate to the first adhesive material; peeling the second passivation film from the adhesive layer; and adhering a flexible substrate onto the second and third adhesive materials.

In another aspect, a fabricating method of a flexible display device comprises the steps of providing an adhesive layer including a first adhesive material on a first surface of a support film, a second adhesive material on a second surface of the support film such that an adhesive strength of the second adhesive material is lower than an adhesive strength of the first adhesive material, and a third adhesive material on the second adhesive material with an adhesive strength higher than the adhesive strength of the second adhesive material; a first passivation film adhered to the first surface of the support film with the first adhesive material therebetween; and a second passivation film adhered to the second surface of the support film with the second adhesive material and the third adhesive material therebetween; peeling the first passivation film from the adhesive layer; adhering a rigid substrate to the first adhesive material; peeling the second passivation film from the adhesive layer; and adhering a flexible substrate onto the second and third adhesive materials.

In another aspect, a fabricating method of a flexible display device comprises the steps of providing an adhesive layer including a first adhesive material on a first surface of a support film and a second adhesive material on a second surface of the support film such that the second adhesive material has a lower adhesive strength than the first adhesive material; a first passivation film adhered to the first surface of the support film with the first adhesive material therebetween; and a second passivation film adhered to the second surface of the support film with the second adhesive material therebetween; peeling the first passivation film from the adhesive layer; adhering a rigid substrate to the first adhesive material; peeling the second passivation film from the adhesive layer; forming a third adhesive material on the second adhesive material to be higher in adhesive strength than the second adhesive material; and adhering a flexible substrate onto the second and third adhesive materials.

In another aspect, a fabricating method of a flexible display device comprises steps of forming first and second jig substrates that have a first groove and a second groove formed in a lower part of an edge of the first groove; spreading an adhesive over the second groove; fixing first and second flexible substrates to the first groove and the adhesive; fabricating an upper array substrate on the first flexible substrate and a lower array substrate on the second flexible substrate; bonding the upper array substrate to the lower array substrate and injecting a liquid crystal therebetween; and peeling the first and second flexible substrates from the first and second jig substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 1A to 1C are diagrams representing a fabricating method of a flexible display device;

FIGS. 4A to 4D are diagrams showing a fabricating method of a lower array substrate;

DETAILED DESCRIPTION OF THE PREFERRED EMBODIMENTS

Reference will now be made in detail to the preferred embodiments of the present invention, examples of which are illustrated in the accompanying drawings. In the accompanying drawings, the thickness of a specific area is enlarged to be shown for helping understand the present invention. With reference to FIGS. 1A to 11, exemplary embodiments of the present invention will be explained as follows.

Figure 1B:
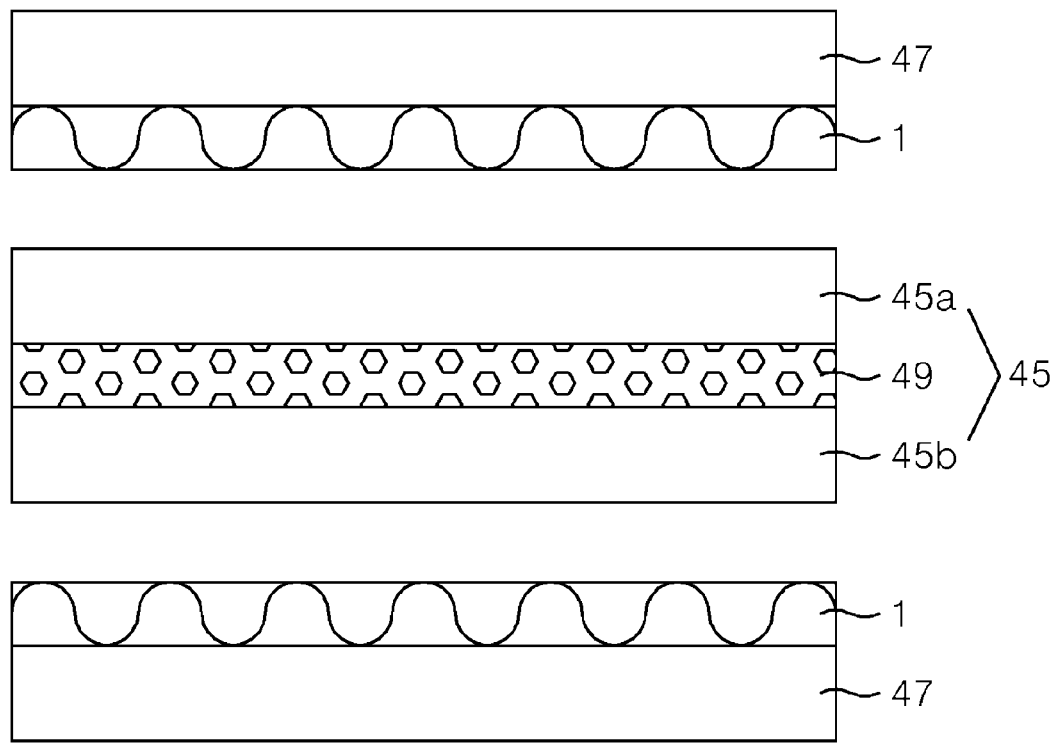
Figure 1C:
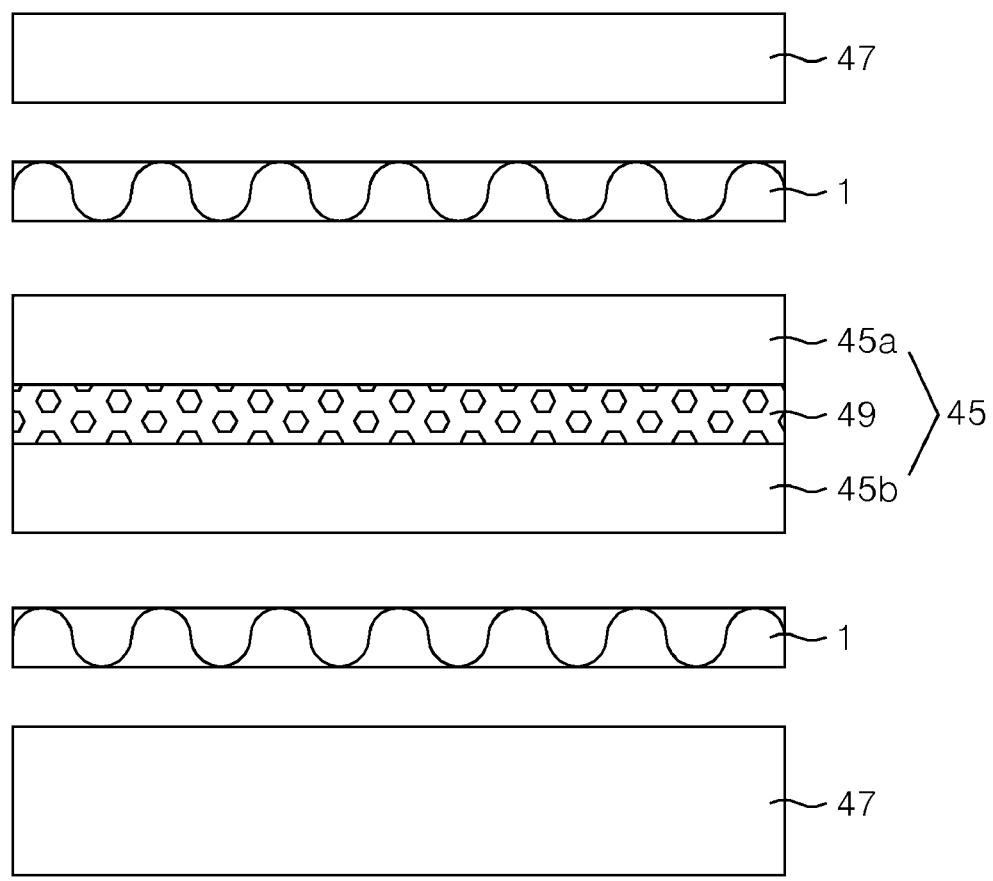

As shown in FIGS. 1A to 1C, a fabricating process of a flexible liquid crystal display device according to the present invention can be mainly divided into a substrate adhering process (S1), an upper array substrate fabricating process (S2), a lower array substrate fabricating process (S3), a liquid crystal process (S4), a peeling process (S5) and a module process (S6). The substrate adhering process S1 is a process for adhering a flexible substrate 45 to a rigid substrate 47, wherein the flexible substrate 45 provides flexibility to a display device and the rigid substrate 47 provides to support so that an electrode formation is precisely performed. Herein, the rigid substrate 47 is formed from a glass substrate and the flexible substrate 45 is formed from a plastic substrate with high heat resistance.

A detailed explanation of the substrate adhering process (S1) will be made with reference to FIGS. 2A to 2C.

The upper/lower array substrate fabricating processes (S2, S3) are processes for forming R, G, B pixels, primary electrodes, etc. A detailed explanation of the upper/lower array substrate fabricating processes (S2, S3) will be made in FIGS. 3A to 4D. The liquid crystal process (S4) is a process of bonding two substrates which are made in the upper/lower array substrate fabricating processes (S2, S3) into one, and injecting a liquid crystal into a liquid crystal layer 49 space thereinside. The peeling process (S5) is a process of peeling the flexible substrate 45 and the rigid substrate 47 of the upper/lower parts which went through the liquid crystal process (S4).

To describe the peeling process (S5) in detail, as shown in FIG. 1B, the flexible substrate 45 adhered to an adhesive surface with low adhesive strength is peeled off. Then, as shown in FIG. 1C, the rigid substrate 47 adhered to an adhesive surface with high adhesive strength is peeled off. In FIGS. 1B and 1C, the electrode and color filter formed on the flexible substrate 45 after the upper/lower array substrate processes (S2, S3) are not shown. The module process (S6) is a process of completing a module by performing a process of adhering a polarizer to and mounting a drive circuit on a panel which is completed through S1 to S5 processes.

Figure 2A:
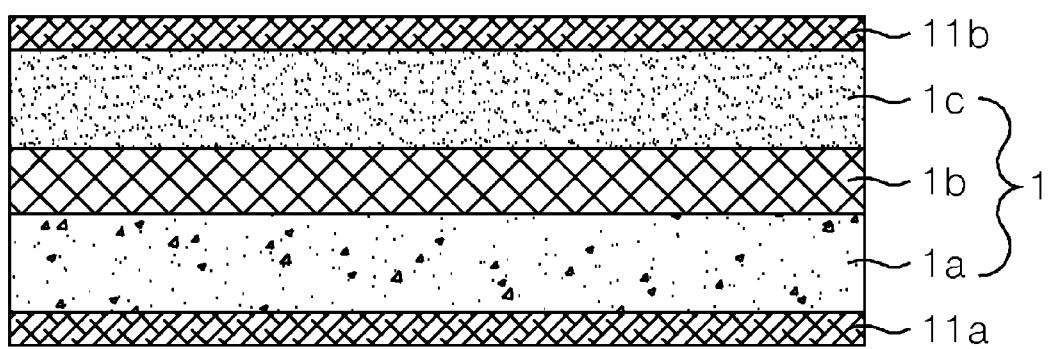
FIGS. 2A to 2C are diagrams showing an adhering process.
Figure 2B:
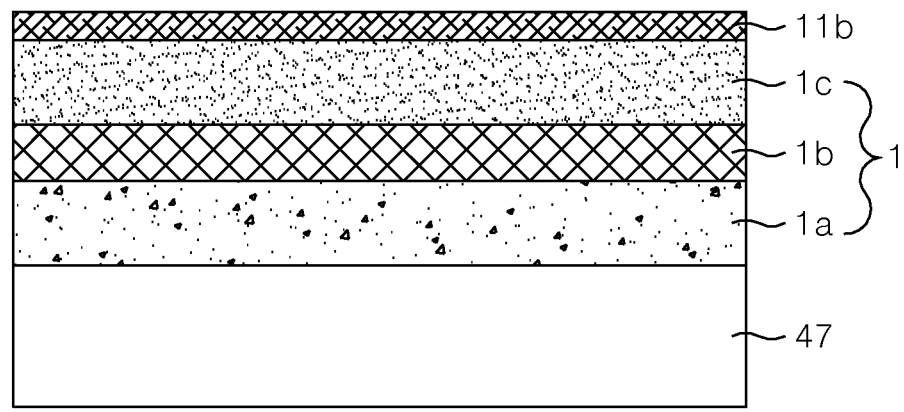
Figure 2C:
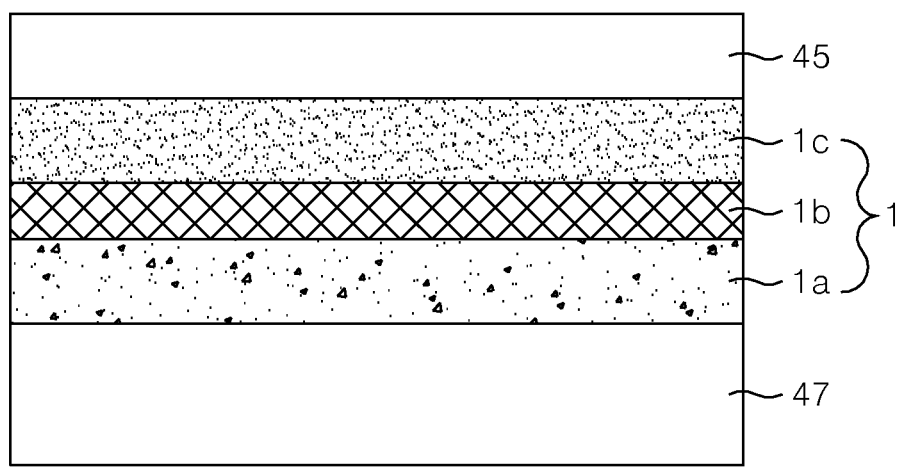

With reference to FIGS. 2A to 2C, the substrate adhering process S1 is discussed in detail as follows.

The rigid substrate 47, which will provide support so that the electrode formation is precisely performed, and the flexible substrate 45, which will provide flexibility to the display device, are adhered to an adhesive layer 1, as shown in FIG. 2A-2C.

The adhesive layer 1, as shown in FIG. 2A, includes a support film 1b and adhesive materials 1a, 1c adhered to a first surface and a second surface of the support film 1b. The support film 1b is located in the middle of the adhesive layer 1 and acts to support the adhesive materials 1a, 1c. The support film 1b is a polymer material with excellent heat resistance, which is mainly made of polyimide PI.

The adhesive materials 1a, 1c are located opposite each other with the support film 1b therebetween. The adhesive materials 1a, 1c are formed of a material with excellent heat resistance and mainly made of acrylic resin or silicon group.

The adhesive strength of the first adhesive material 1a to which the rigid substrate 47 is adhered and the second adhesive material 1c to which the flexible substrate 45 is adhered can be formed to be strong or weak in accordance with a composition of the adhesive materials 1a or 1c. In FIG. 2A, the second adhesive material 1c has its adhesive strength lower than that of the first adhesive material 1a. The adhesive layer 1 is covered by first and second passivation films 11a, 11b, which shut off contact with the outside.

With reference to FIG. 2B, in the substrate adhering process (S1), the first passivation film 11a is peeled off and the rigid substrate 47 is adhered to the first adhesive material 1a. As shown in FIG. 2C, in the substrate adhering process (S1), after peeling off the second passivation film 11b of the adhesive layer 1, the flexible substrate 45 is adhered onto the second adhesive material 1c. (S1) The adhesive layer 1 is formed with dual adhesive strengths of the first adhesive material 1a and the second adhesive strength 1c is so that the flexible substrate 45 and the rigid substrate 47 can be peeled off step by step when performing the peeling process (S5), as shown in FIGS. 1B and 1C.

The upper/lower array substrate fabricating processes (S2, S3) are processes of forming basic electrodes. The lower array substrate includes a plurality of signal lines, a thin film transistor and an alignment film spread thereover for aligning the liquid crystal. The upper array substrate includes a color filter for realizing color, a black matrix for preventing light leakage and an alignment film spread thereover for aligning the liquid crystal.

FIGS. 3A to 3E represent the upper array substrate fabricating process (S2) step by step.

Figure 3A:
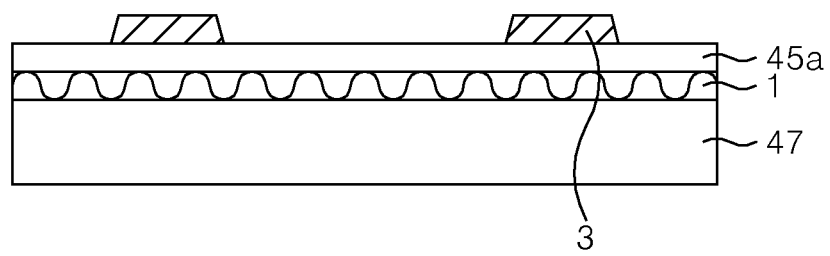
FIGS. 3A to 3E are diagrams showing a fabricating method of an upper array substrate.
Figure 3B:
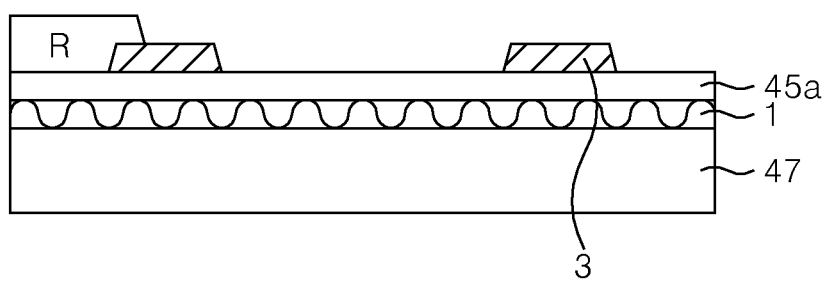
Figure 3C:
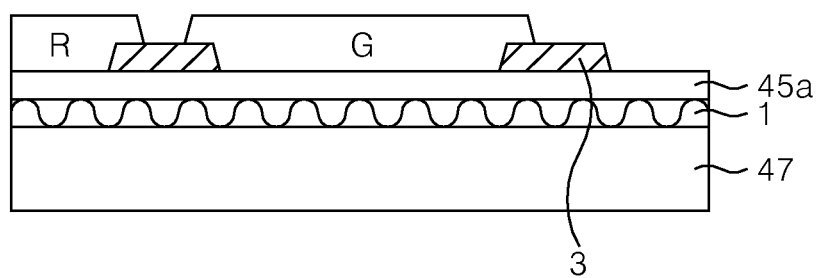
Figure 3D:
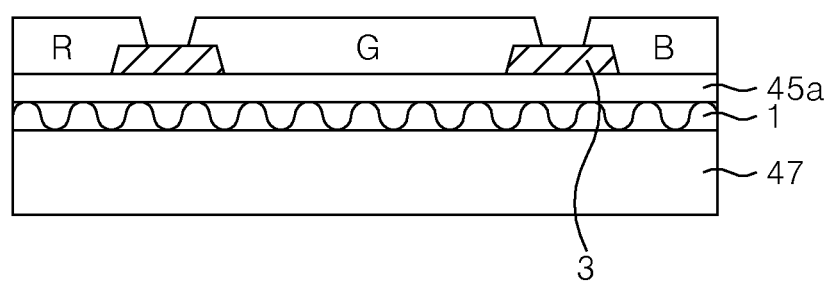
Figure 3E:
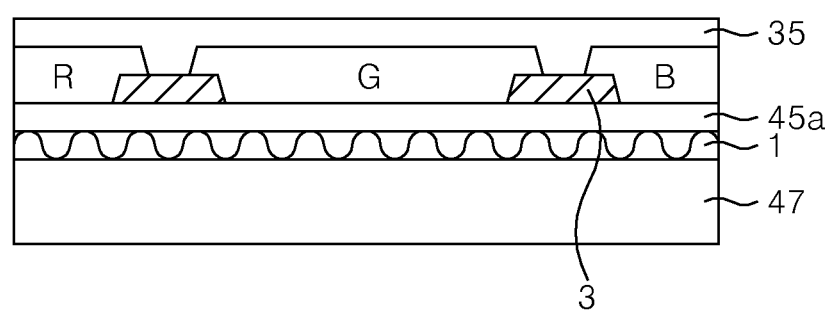

First, after an opaque material, such as opaque metal or opaque resin, is deposited on a first flexible substrate 45a following the foregoing substrate adhering process (S1), an organic material is patterned by a photolithography process and an etching process, thereby forming the black matrix 3, as shown in FIG. 3A. The opaque metal is generally chrome Cr, and the opaque resin is an organic material. After a red resin is deposited on the first flexible substrate 45a where the black matrix 3 is formed, the red resin is patterned by the photolithography process and the etching process, thereby forming a red color filter R, as shown in FIG. 3B. After a green resin is deposited on the first flexible substrate 45a where the red color filter R is formed, the green resin is patterned by the photolithography process and the etching process, thereby forming a green color filter G, as shown in FIG. 3C. After a blue resin is deposited on the first flexible substrate 45a where the green color filter G is formed, the blue resin is patterned by the photolithography process and the etching process, thereby forming a blue color filter B, as shown in FIG. 3D. After a transparent conductive material is deposited on the first flexible substrate 45a where the red, green and blue color filters are formed, the transparent conductive material is patterned by the photolithography process and the etching process, thereby forming a common electrode 35, as shown by the upper array substrate fabricating process (S2) of FIG. 3E.

With reference to FIGS. 4A to 4D, the lower array substrate fabricating method (S3) using four mask processes is taken as an example as follows.

First, a first conductive pattern group including a gate line 2, a gate electrode 8 and a gate pad lower electrode 26 is formed, as shown in FIG. 4A, on the second flexible substrate 45b which went through the substrate adhering process (S1) using the first mask process. To describe a process of forming the first conductive pattern group in detail, a gate metal layer is formed on the second flexible substrate 45b by a deposition method, such as sputtering. Subsequently, the gate metal layer is patterned by the photolithography process and the etching process using the first mask, thereby forming the first conductive pattern group including the gate line 2, the gate electrode 8 and the gate pad lower electrode 26. Herein, the gate metal layer is made of aluminum group metal.

Figure 4B:
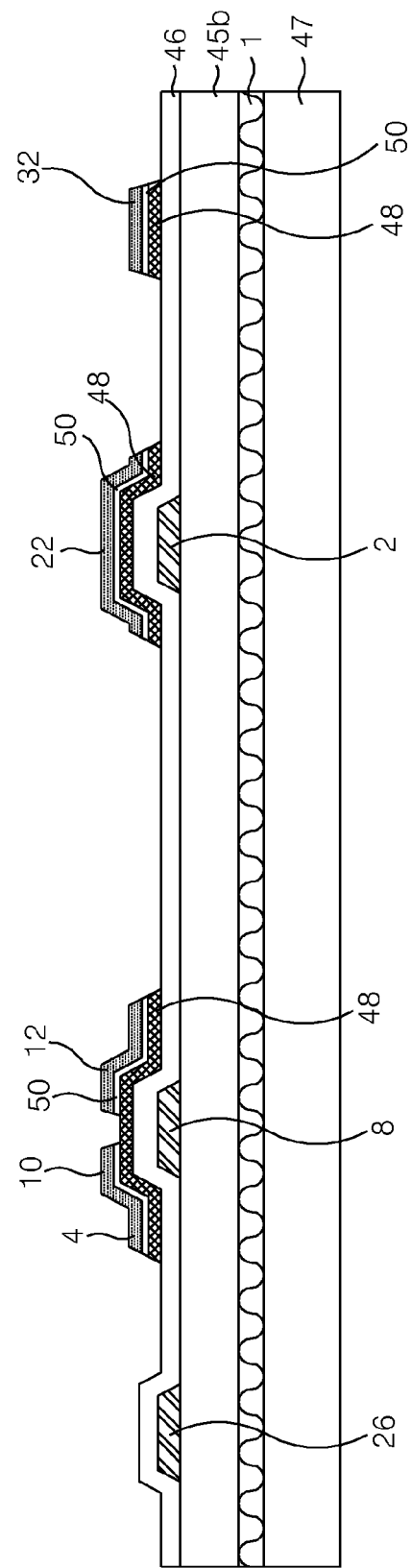

As shown in FIG. 4B, a gate insulating film 46 is spread over the second flexible substrate 45b where the first conductive pattern group is formed. A semiconductor pattern including an active layer 48 and an ohmic contact layer 50; and second conductive pattern group including a data line, a source electrode 10, a data electrode 12, a data pad lower electrode 32, and a storage electrode 22 are formed on the gate insulating film 46 using a second mask process.

A process of forming the second conductive pattern group will now be described in detail. The gate insulating film 46, an amorphous silicon layer, an n+ amorphous silicon layer and a source/drain metal layer are sequentially formed on the lower substrate 45 where the first conductive pattern group is formed by a deposition method, such as PECVD or sputtering. Herein, the gate insulating film 46 is formed of an inorganic insulating material, such as silicon oxide SiOx or silicon nitride SiNx. Molybdenum Mo, titanium Ti, tantalum Ta or a molybdenum Mo alloy is used as the source/drain metal.

Subsequently, a photo-resist pattern is formed on the source/drain metal layer by the photolithography process using the second mask. In this case, a diffractive exposure mask having a diffractive exposure part in a channel part of the thin film transistor is used as the second mask. Thus, the photo-resist pattern of the channel part is made with a lower height than the other source/drain pattern parts.

Next, the source/drain metal layer is patterned by a wet etching process using the photo-resist pattern, thereby forming the second conductive pattern group including the data line 4, the source electrode 10, the drain electrode integrated with the source electrode 10, and the storage electrode 22. Then, the n+ amorphous silicon layer and the amorphous silicon layer are simultaneously patterned by a dry etching process using the same photo-resist pattern, thereby forming the ohmic contact layer 50 and the active layer 48.

After removing the photo-resist pattern, which has a relatively low height in the channel part, by an ashing process, the source/drain metal pattern and ohmic contact layer 50 of the channel part is etched by the dry etching process. Accordingly, the active layer 48 of the channel part is exposed to separate the source electrode 10 from the drain electrode 12. Subsequently, the photo-resist pattern remaining on the second conductive pattern group is removed by a stripping process.

Figure 4C:
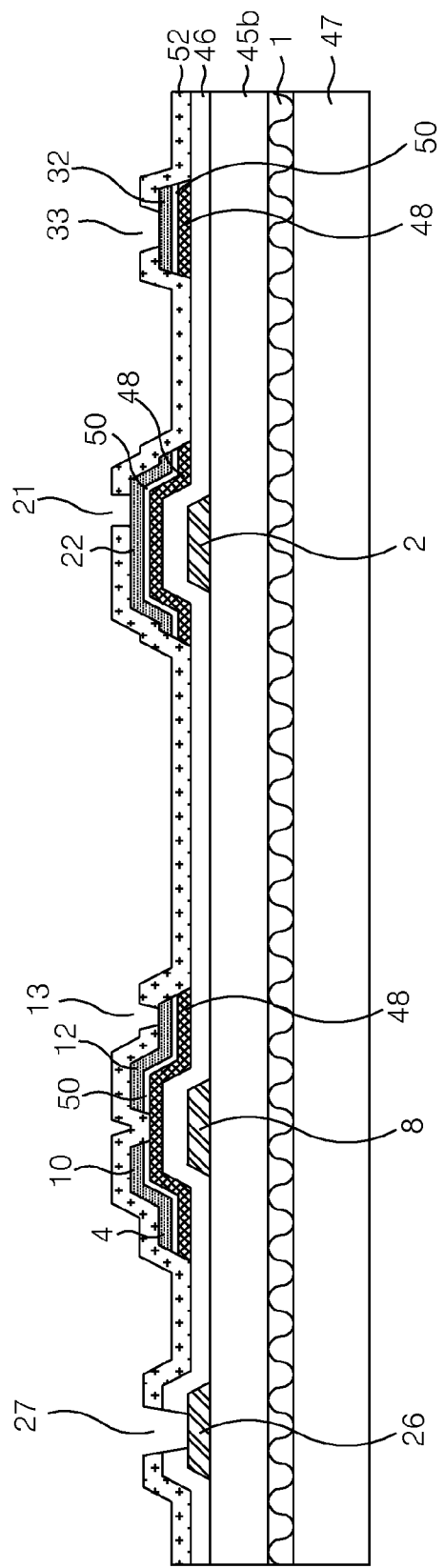

Referring to FIG. 4C, a passivation film 52 including first to fourth contact holes 13, 21, 27, 33 is formed on the gate insulating film 46 where the second conductive pattern group is formed, by a third mask process. In detail, the passivation film 52 is formed on the gate insulating film 46 where the second conductive pattern group is formed, by the deposition method such as PECVD. Subsequently, the passivation film 52 is patterned by the photolithography process and the etching process using a third mask, thereby forming the first to fourth contact holes 13, 21, 27, 33. The first contact hole 13 penetrates the passivation film 52 to expose the drain electrode 12, and the second contact hole 21 penetrates the passivation film 52 to expose the storage electrode 22. The third contact hole 27 penetrates the passivation film 52 and the gate insulating film 46 to expose the gate pad lower electrode 26, and the fourth contact hole 33 penetrates the passivation film 52 to expose the data pad lower electrode 32. Herein, when using a metal with high etching ratio like molybdenum Mo as the source/drain metal, the first, second and fourth contact holes 12, 21, 33 respectively penetrate as far as the drain electrode 12, the storage electrode 22 and the data pad lower electrode 32 to expose the side surface thereof. The passivation film 52 is made of an inorganic insulating material, such as the gate insulating film 46 or an organic insulating material like PFCB, BCB or an acrylic organic compound with a low dielectric constant.

Figure 4D:
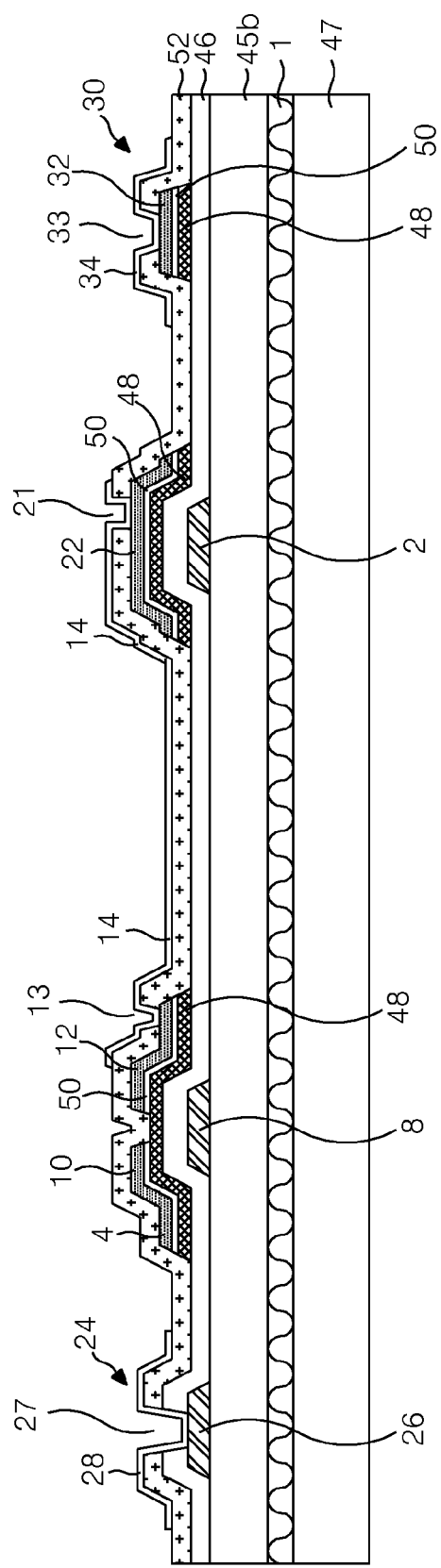

Referring to FIG. 4D, a third conductive pattern group including the pixel electrode, the gate pad upper electrode 28 and the data pad upper electrode 34 is formed on the passivation film 52 by a fourth mask process. Specifically, a transparent conductive film is spread on the passivation film 52 by a deposition method, such as sputtering. Subsequently, the transparent conductive film is patterned by the photolithography process and the etching process using a fourth mask, thereby forming the third conductive pattern group including the pixel electrode 14, the gate pad upper electrode 28 and the data pad upper electrode 34. The pixel electrode 14 is electrically connected to the drain electrode through the first contact hole 13 and is electrically connected to the storage electrode 22 through the second contact hole 21. The gate pad upper electrode is electrically connected to the gate pad lower electrode 26 through the third contact hole 37. The data pad upper electrode 34 is electrically connected to the data pad lower electrode 32 through the fourth contact hole 33.

Herein, the transparent conductive film is made of any one of indium thin oxide ITO, tin oxide TO, indium tin zinc oxide ITZO, and indium zinc oxide IZO. (S3). The deposition method for forming each electrode as described in the upper/lower array substrate fabricating processes (S2, S3) includes a PECVD (plasma enhanced chemical vapor deposition) method, a sputtering method, etc. When applying these methods, conditions such as a vacuum state, a designated substrate temperature, a reactive gas, and a reactive pressure are required.

On the other hand, small bubbles may be generated in the surface of the flexible substrate 45 adhered to the second adhesive material 1C and the surface of the rigid substrate 47 adhered to the first adhesive material 1a. Such small bubbles can be united to make bigger bubbles when forming the vacuum state in the upper/lower array substrate fabricating processes (S2, S3). The phenomenon that the bubbles get united into bigger sized bubbles is generated in the adhered surface of the flexible substrate 45 and the second adhesive material 1C because the adhesive strength of the surface of the flexible substrate 45 adhered to the second adhesive material 1C is relatively lower than the adhesive strength of the surface of the rigid substrate 47 adhered to the first adhesive material 1a. Thus, the flexible substrate 45 can be peeled from the adhesive material 1 during the fabricating process because of the bubbles that get bigger.

Further, the upper/lower array substrate fabricating processes (S2, S3) is performed on the flexible substrate 45, which is relatively weaker than the glass substrate of the existing liquid crystal display device. Thus, the flexible substrate 45 is stressed by conditions such as temperature and pressure, which are generated when performing deposition, thereby making it possible that the flexible substrate 45 adhered to the second adhesive material 1c is shrunk. Further, the surface of the flexible substrate 45 adhered to the second adhesive material 1c can be peeled from the adhesive layer 1 because of the low adhesive strength of the second adhesive material 1c in the wet etching or cleaning process that takes place when performing the upper/lower array substrate fabricating processes (S2, S3).

FIGS. 5A to 10B are diagrams showing a fabricating method of a flexible display device according to the present invention for preventing the peeling of the flexible substrate is peeled in the course of performing the fabricating process of the flexible display device as above.

Figure 5A:
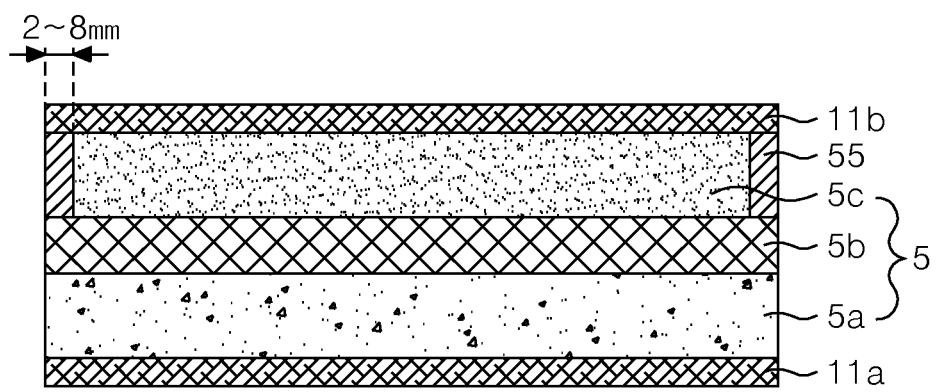
FIGS. 5A and 5B are adhesive structure diagrams according to a first exemplary embodiment of the present invention.
Figure 5B:
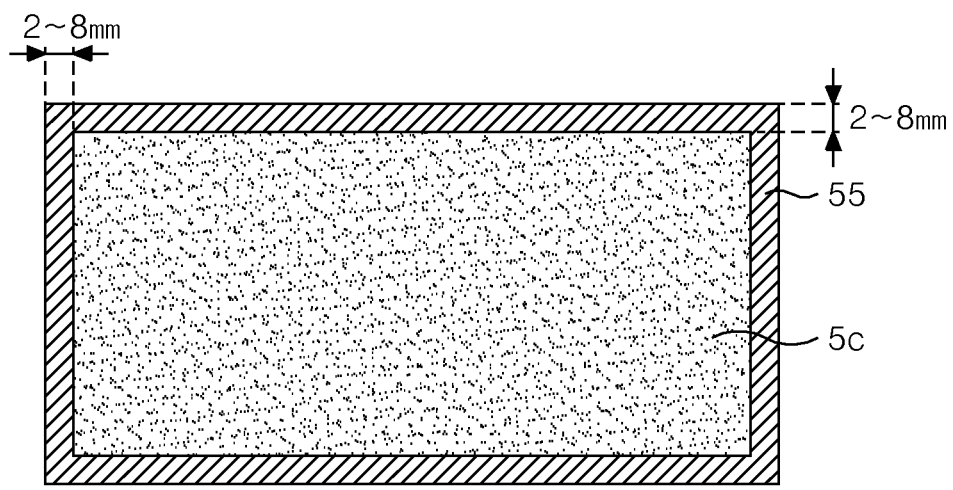

FIGS. 5A and 5B are diagrams showing a structure of a adhesive layer 5 used in a fabricating method of a flexible substrate according to a first exemplary embodiment of the present invention. As shown in FIGS. 5A and 5B, the adhesive layer 5 according to the first exemplary embodiment of the present invention includes a first adhesive material 5a, a support film 5b, a second adhesive material 5c and a third adhesive material 55. The second adhesive material 5c is formed to have a relatively lower adhesive strength than the first adhesive material 5a, and the third adhesive material 55 is formed to have a relatively higher adhesive strength than the second adhesive material 5c. The adhesive strength of the third adhesive material 55 can be formed to be the same as the adhesive strength of the first adhesive material 5a. The support film 5b provides a support force to the first to third adhesive materials 5a, 5c, 55. There is generated a peeling phenomenon during the fabricating process of the flexible display device due to the low adhesive strength of the related art second adhesive material 1c layer shown in FIG. 2A. To prevent this, the third adhesive material 55 is formed with a proper width in the edge of the second adhesive material 5c layer in the first embodiment of the present invention. FIG. 5B is a plane view showing the third adhesive material 55 formed in the edge of the second adhesive material 5c layer. The adhesive layer 5 with such a configuration is protected from the outside by the first and second passivation films 11a, 11b. A process of adhering the flexible substrate 45, which will provide flexibility to the display device, to the rigid substrate 47 using the adhesive which includes the adhesive layer 5 and the first and second passivation films 11a, 11b according to the first exemplary embodiment of the present invention is as described in FIGS. 2B and 2C.

Figure 6:
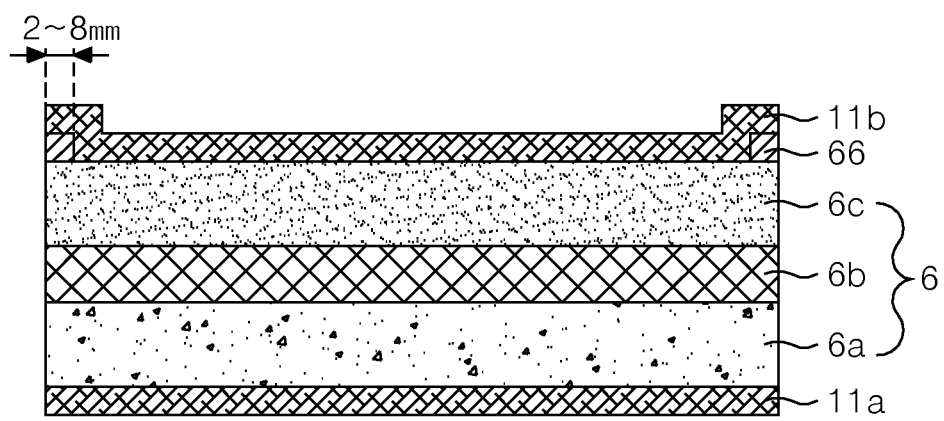
FIG. 6 is a an adhesive structure diagram according to a second exemplary embodiment of the present invention.

FIG. 6 shows an adhesive layer structure in a fabricating method of a flexible display device according to a second exemplary embodiment of the present invention.

The adhesive layer 6 according to the second exemplary embodiment of the present invention includes a first adhesive material 6a, a support film 6b, a second adhesive material 6C and a third adhesive material 66. The second adhesive material 6c is formed to have a relatively lower adhesive strength than the first adhesive material 6a, and the third adhesive material 66 is formed to have a relatively higher adhesive strength than the second adhesive material 6c. The adhesive strength of the third adhesive material 66 can be formed to be the same as the adhesive strength of the first adhesive material 6a. The support film 6b provides a support force to the first and second adhesive materials 6a, 6c. The third adhesive material 66 is formed to prevent the peeling phenomenon of the flexible substrate that is generated during the course of performing the fabricating process of the flexible display device. The third adhesive material 66 is formed at the upper edge of the second adhesive material 6c after the second adhesive material is formed. The adhesive layer 6 and the third adhesive material 66 are protected from the outside by the first and second passivation films 11a, 11b. Further, a process of adhering the flexible substrate 45, which will provide flexibility to the display device, to the rigid substrate 47 by use of the adhesive, which includes the adhesive layer 6 and the first and second passivation films 11a, 11b according to the second exemplary embodiment of the present invention is as described in FIGS. 2B and 2C.

Figure 7A:
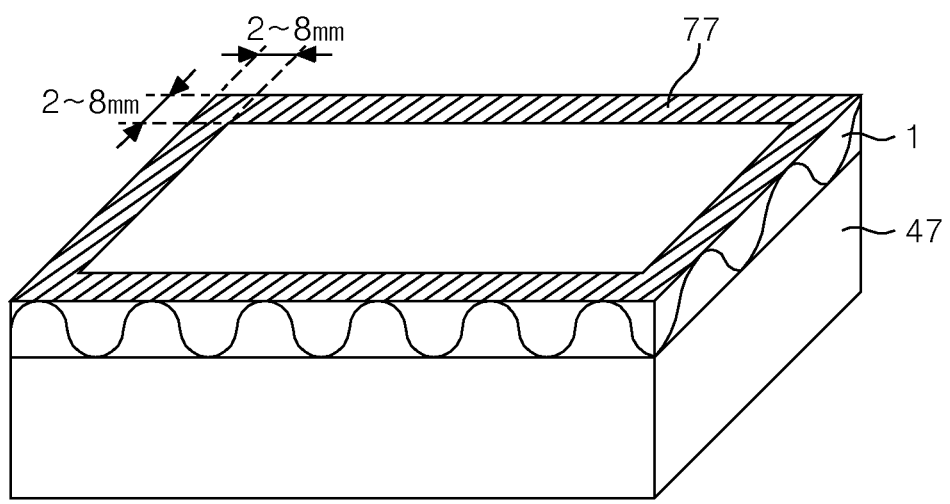
FIGS. 7A and 7B are diagrams showing an adhering process of a flexible display device according to a third exemplary embodiment of the present invention.
Figure 7B:
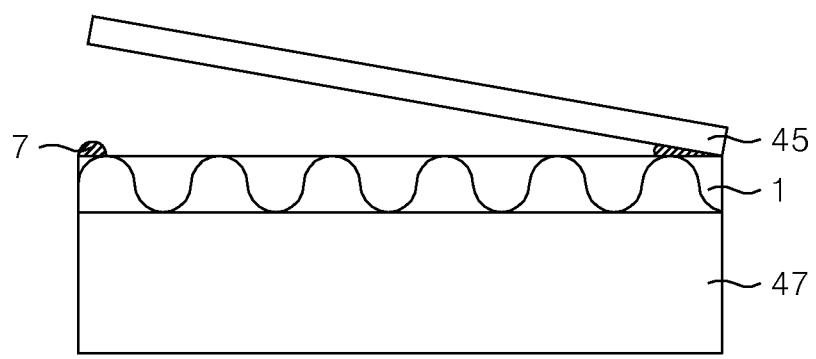

FIGS. 7A and 7B are diagrams showing a fabricating method of a flexible display device according to a third exemplary embodiment of the present invention.

The substrate adhering process (S1) according to the third exemplary embodiment of the present invention is the same as the above description as far as the step of peeling the first passivation film 11a from the adhesive layer 1 and adhering it to the rigid substrate 47, and the step of peeling the second passivation film 11b form the adhesive layer 1 to which the rigid substrate 47 is adhered, as shown in FIGS. 2A to 2C. Then, the third exemplary embodiment of the present invention further includes the step of printing a third adhesive material 77 with a proper width at the upper edge of the second adhesive material 1c from which the second passivation film 11b is peeled. In the method of forming the third adhesive material 77, there is a method of forming it in the same manner as treating a sealant except a portion of the printing method. There is performed a step of adhering the flexible substrate 45 to the second adhesive material 1c and the printed third adhesive material 77 after forming the third adhesive material 77. Herein, the third adhesive material 77 is formed to have a relatively higher adhesive strength than the second adhesive material 1c. The adhesive strength of the third adhesive material 77 can be formed to be the same as the adhesive strength of the first adhesive material 1a.

In the first to third exemplary embodiments of the present invention, the width of the edge of the second adhesive material 5c, 6c, 1c and the width of the third adhesive material 55, 66, 77 formed in the upper part of the second adhesive material 5c, 6c, 1c are desirably 2~8 mm. If they are formed to be less than 2 mm, the peeling phenomenon generated during the course of performing the fabricating process of the flexible display device cannot be prevented. If they are formed to be more than 8 mm, the flexible substrate 45 and the rigid substrate 47 cannot be peeled step by step in the peeling process (S5).

Figure 8A:
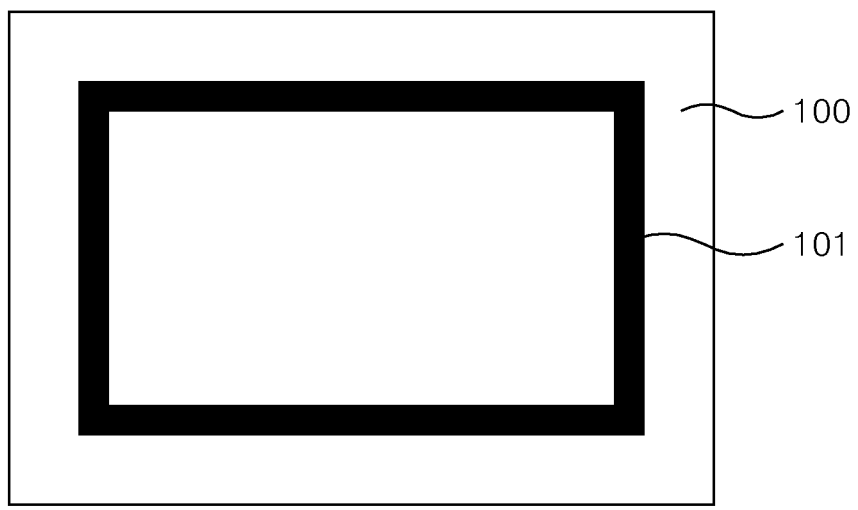
FIGS. 8A to 8C are diagrams showing an adhering process of a flexible display device according to a fourth exemplary embodiment of the present invention.
Figure 8B:
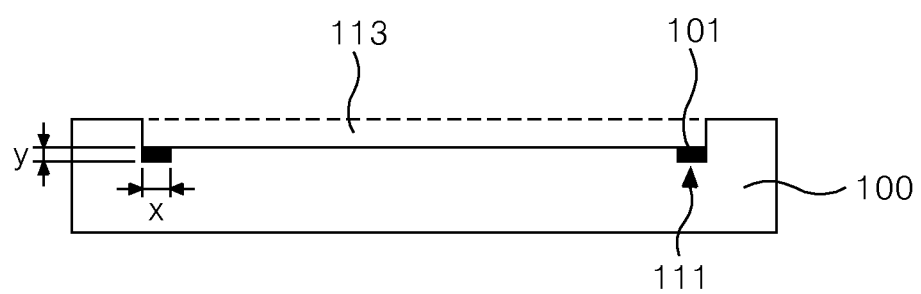
Figure 8C:
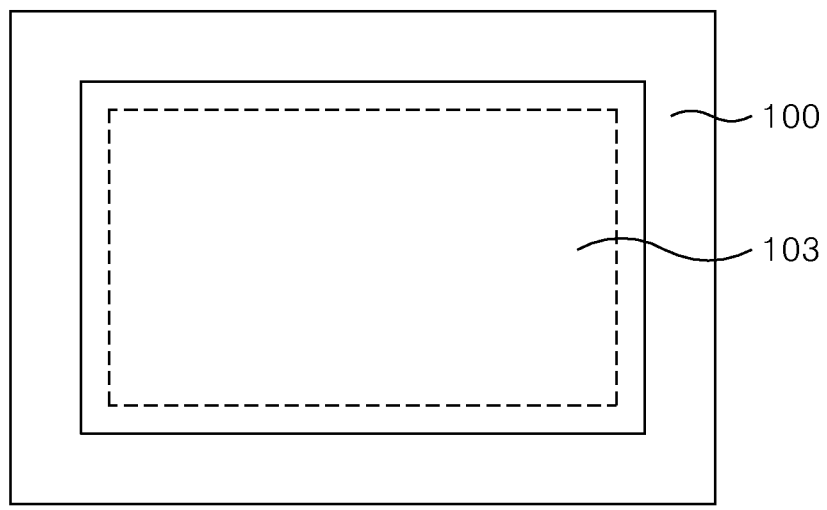

FIGS. 8A to 8C show an adhering process (S1) of a flexible display device according to a fourth exemplary embodiment of the present invention. Referring to FIGS. 8A to 8C, there is provided a jig substrate 100 including a first groove 113 and a second groove 111 through an etching process as shown in FIGS. 8A and 8B. Next, an adhesive 101 is spread over the second 111 of the jig substrate 100, and then a flexible substrate 103 is adhered to the first groove 113 of the upper part of the jig substrate 100 and the adhesive 101 spread over the second groove 111, as shown in FIG. 8C.

The jig substrate 100 includes the first groove 113 where the flexible substrate 101 is to be placed, and a second groove 111 into which the adhesive 101 is to be filled. The first groove 113 and the second groove 111 are formed by performing the etching process on the glass substrate, which is the rigid substrate. Using the glass substrate as the rigid substrate like this is because the jig substrate 100 fabrication becomes complicated when using a metal substrate since a separate coating treatment is required to prevent chemical damage.

The width and thickness of the first groove is formed to be the same as the width and thickness of the flexible substrate 103 so as to make the flexible substrate 103 fixed. The first groove 113 fixes the flexible substrate 103 in the fabricating process of the flexible display device, thereby enabling the flexible substrate 103 to be supported during the fabricating process of the flexible display device. Also, the second groove 111 is formed in the lower part of the edge of the first groove 113 to provide a space over which the adhesive 101 can be spread. The width (x) of the second groove is 5 mm~100 mm. If the width (x) of the second groove is less than 5 mm, the adhesive force is not sufficiently provided, thus the flexible substrate is peeled during the fabricating process of the flexible display device, and therefore not less than 5 mm is desired. Further, if the width (x) of the second groove exceeds 100 mm, it becomes difficult to perform the peeling process later on, therefore not more than 100 mm is desired. And, the thickness (y) of the second groove is formed to be the same as that of the adhesive 101. The thickness (y) of the second groove formed as much as the thickness of the adhesive 101 enables to improve a stepped difference which is generated between the flexible substrate 45 and the rigid substrate 47 when being adhered to the adhesive materials 66, 77 with the stepped difference as in the second and third exemplary embodiments of the present invention.

Figure 9:
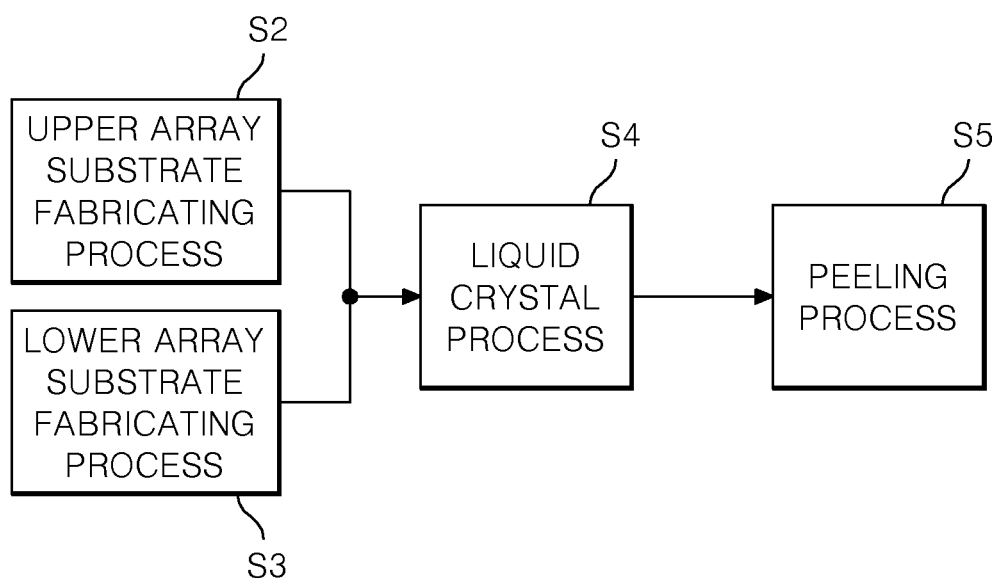
FIG. 9 is a diagram representing a part of the fabricating method of the flexible display device.
Figure 10A:
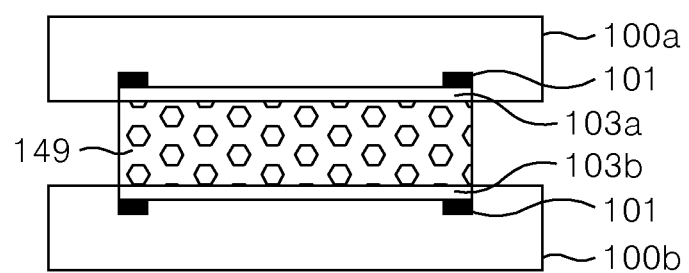
FIGS. 10A and 10B are diagrams showing a peeling process of a flexible display device according to the fourth exemplary embodiment of the present invention.
Figure 10B:
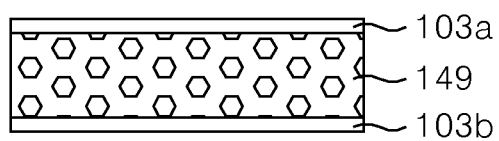

FIGS. 9 and 10A-10B are diagrams briefly illustrating processes after performing the adhering process (S1) of the flexible display device according to the fourth exemplary embodiment of the present invention. Specifically, FIGS. 10A and 10B are diagrams for explaining the peeling process (S5) of the flexible display device according to the fourth exemplary embodiment of the present invention, and there are not shown electrodes and color filters which are formed after the upper/lower array substrate process. The adhering process (S1) of the flexible substrate 103 and the jig substrate 100 are respectively performed in a first jig substrate 100A and a first flexible substrate 103a that will go through the upper array substrate fabricating process (S2), and in a second jig substrate 100b and a second flexible substrate 103b that will go through the lower array substrate fabricating process (S3).

Then, as shown in FIG. 9, the upper/lower array substrate fabricating processes (S2, S3) are performed in the upper part of the flexible substrate stuck to the jig substrate. A detailed explanation for the upper/lower array substrate fabricating processes (S2, S3) will be omitted since it was described in FIGS. 3A to 4D.

Next, the two substrates, which are fabricated in the upper array substrate fabricating process (S2) and the lower array substrate fabricating process (S3), are bonded together, and the liquid crystal process (S4) of injecting a liquid crystal 149 into space therein is performed. A peeling process (S5) of peeling the upper/lower array substrates from the adhesive for the upper/lower array substrates that went through the liquid crystal process (S4) is performed.

To describe the peeling process (S5) in detail with reference to FIGS. 10A and 10B, the peeling process (S5) is different in accordance with a kind of the adhesive (101) spread over the second groove 111. An ultraviolet ray UV type and a thermal type of adhesive and a polyimide PI adhesive tape with high heat resistance can be used as the adhesive 101 spread over the second groove.

When using the ultraviolet ray type adhesive, if ultraviolet rays are irradiated onto the adhesive 101 when performing the peeling process (S5), the adhesive 101 loses the adhesive force. Thus, the first and second flexible substrates 103a, 103b are peeled from the first and second jig substrates 100a, 100b.

An adhesive that loses the adhesive force at a temperature below the normal temperature and an adhesive that loses the adhesive force at a temperature of 20° C.~200° C. can be used as the thermal type adhesive. When using the adhesive that loses the adhesive force at the temperature below the normal temperature, the peeling process (S5) is performed by a cool-off method of applying a temperature below the normal temperature to the adhesive 101 for the adhesive 101 to lose the adhesive force. When using the adhesive that loses the adhesive force at the temperature of 20° C.~200° C., the peeling process (S5) is performed by a warm-off method of applying a temperature of 20° C.~200° C. to the adhesive 101 for the adhesive 101 to lose the adhesive force. When using the polyimide adhesive tape during the peeling process (S5), the edge of the first and second flexible substrates 103a, 103b to which the polyimide adhesive tape is adhered is cut by a laser for peeling.

In this way, the fabricating method of the flexible display device can be easily applied to the liquid crystal display panel of ECB (electrical controlled bi-refingence), VA (vertical alignment) mode, as well as to the liquid crystal display panel of IPS mode and TN mode. Furthermore, it can also be used in a fabricating method of an organic electro luminescence display device.

Figure 11:
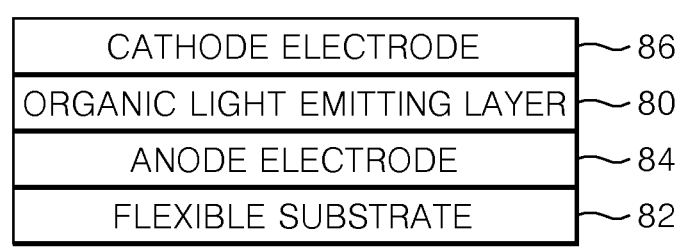
FIG. 11 is a diagram briefly showing a cross-sectional structure of an organic electro luminescence display device.

Referring to FIG. 11, there is briefly described a cross-sectional structure of an organic electro luminescence display device that is fabricated by applying the exemplary embodiments of the present invention. The brief structure of the flexible electro luminescence display device includes an anode electrode 84, a cathode electrode 86 on an upper part of a flexible substrate 82, and an organic light emitting layer 80 formed at each crossing part of the anode electrode 84 and the cathode electrode 86. If a driving signal is applied to the anode electrode 84 and the cathode electrode 86 of the organic electro luminescence display device with such a structure, an electron and a hole are emitted, and the electron and the hole emitted from the anode electrode 84 and the cathode electrode 86 are re-combined within an organic light emitting layer 80 to generate a visible ray. At this moment, the generated visible ray exits to the outside through the anode electrode 84, thereby displaying a designated picture or image.

As described above, the fabricating method of the present invention includes the third adhesive material in the edge of the upper part of the second adhesive material and the edge of the second adhesive material of the adhesive layer used in the substrate adhering process, or the step of printing the third adhesive material in the edge of the upper part of the second adhesive material in the adhering process. Accordingly, the risk of the peeling generated by the low adhesive force of the second adhesive material during the fabricating process of the flexible display device can be reduced. Further, the first adhesive material protects the side surface, which is a weak point of the flexible substrate to which the second adhesive material is adhered, thereby preventing the shrinkage of the flexible substrate that is caused by the stress of the deposited film that is generated upon each process. As a result, the stability of the fabricating process of the flexible display device and improved productivity improvement are achieved.

Further, by forming the jig substrate having the groove to which the flexible substrate is to be fixed and the groove over which the adhesive is to be spread, the fabricating process of the flexible display device can be performed more stably. The jig can be made easily, thereby simplifying the process, enabling productivity improvement and increasing process stability.

It will be apparent to those skilled in the art that various modifications and variations can be made in the fabricating method of a flexible display of the present invention without departing from the spirit or scope of the invention. Thus, it is intended that the present invention cover the modifications and variations of this invention provided they come within the scope of the appended claims and their equivalents.

What is claimed is:

1. A fabricating method of a flexible display device, comprising the steps of:
    forming first and second jig substrates that have a first groove and a second groove formed in a lower part of an edge of the first groove;
    spreading an adhesive over the second groove of each of the first and second jig substrates;
    fixing first and second flexible substrates to the first and second jig substrates via the adhesive in the respective second grooves;
    fabricating an upper array substrate on the first flexible substrate and a lower array substrate on the second flexible substrate;
    bonding the upper array substrate to the lower array substrate and injecting a liquid crystal therebetween; and
    peeling the first and second flexible substrates from the first and second jig substrates.

2. The fabricating method according to claim 1, wherein a width of the second groove is formed between 5 mm and 100 mm, and wherein the second groove is formed with the same thickness as the adhesive.

3. The fabricating method according to claim 1, wherein the first groove is formed with the same width and thickness as the flexible substrate.

4. The fabricating method according to claim 1, wherein the adhesive spread over the second groove includes a polyimide tape, and wherein the step of peeling the first and second flexible substrates from the first and second jig substrates is performed by cutting an edge of the first and second flexible substrates, to which the polyimide tape is adhered, using a laser.

5. The fabricating method according to claim 1, wherein the adhesive spread over the second groove includes an adhesive which loses an adhesive force in response to ultraviolet radiation, and wherein the step of peeling the first and second flexible substrates from the first and second jig substrates is performed by ultraviolet irradiation of the adhesive.

6. The fabricating method according to claim 1, wherein the adhesive spread over the second groove includes an adhesive which loses an adhesive force in response to temperature, and wherein the step of peeling the first and second flexible substrates from the first and second jig substrates is performed by applying a temperature to the adhesive.

* * * * *